Figure 3:
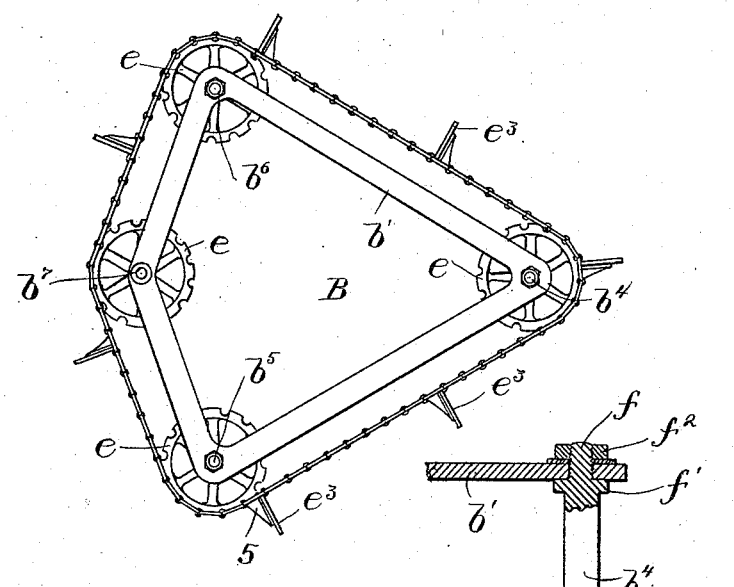

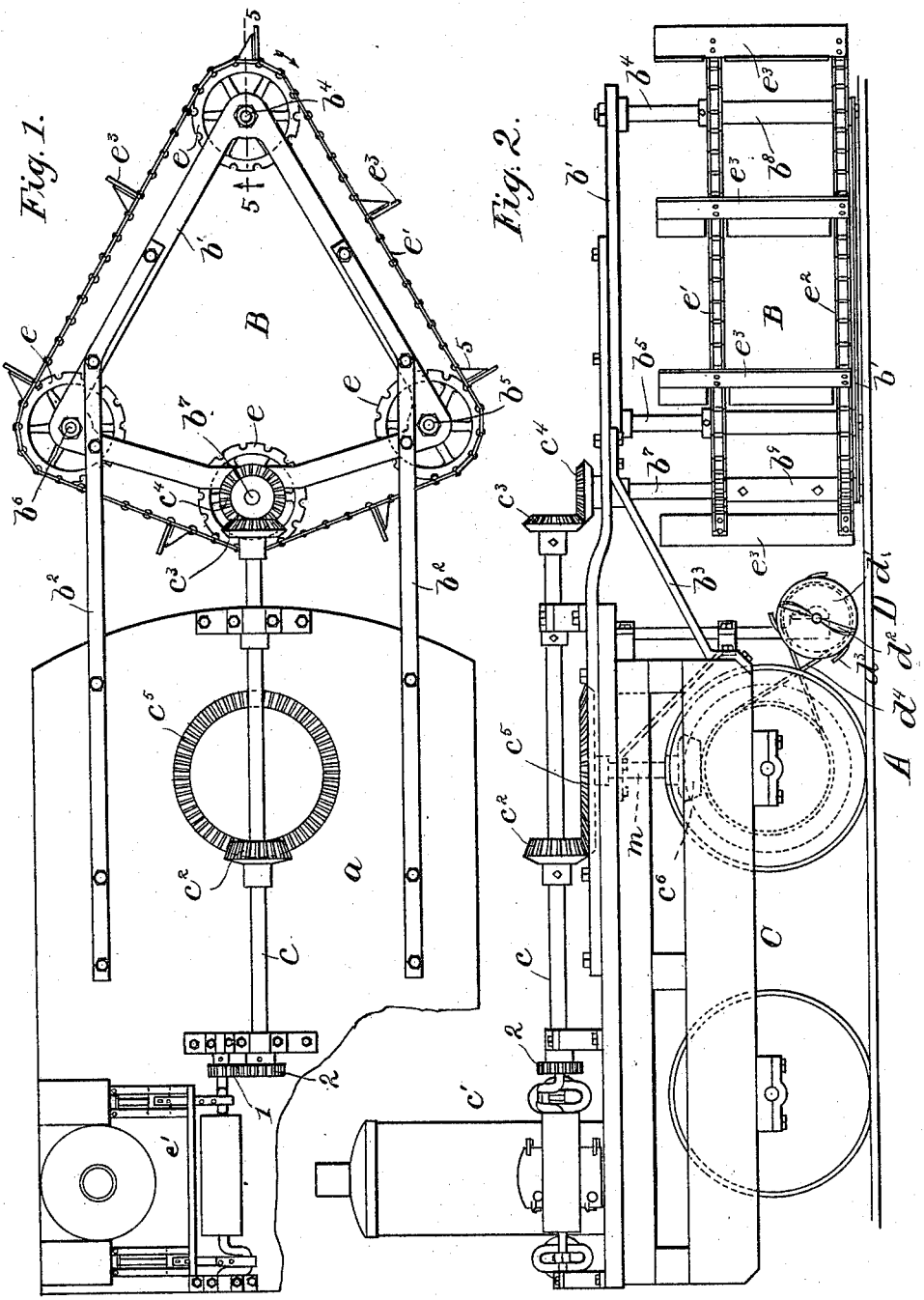

(No Model.) 2 Sheets—Sheet 2.
A. NUTTING.
SNOW PLOW.

No. 579,544. Patented Mar. 23, 1897.

Witnesses:
H. A. Hall.
Arthur H. Abell.

Inventor:
Abel Nutting.
by Wright, Brown & Quimby
att'ys.

UNITED STATES PATENT OFFICE.

ABEL NUTTING, OF QUINCY, MASSACHUSETTS, ASSIGNOR, BY MESNE ASSIGNMENTS, OF ONE-HALF TO CARL A. SCOTT, OF MELROSE, MASSACHUSETTS.

SNOW-PLOW.

SPECIFICATION forming part of Letters Patent No. 579,544, dated March 23, 1897.

Application filed January 2, 1895. Renewed January 2, 1897. Serial No. 617,831. (No model.)

*To all whom it may concern:*

Be it known that I, ABEL NUTTING, of Quincy, in the county of Norfolk and State of Massachusetts, have invented certain new and useful Improvements in Snow-Plows, of which the following is a specification.

My invention relates to an improvement in snow-plows, and especially to that class of snow-plows designed to be used upon street-railways; and it consists in the novel construction and arrangement of parts hereinafter fully described in the specification, clearly illustrated in the drawings, and particularly pointed out in the claim.

Reference is to be had to the accompanying drawings, forming a part of this application, in which like characters indicate like parts wherever they occur.

Figure 4:
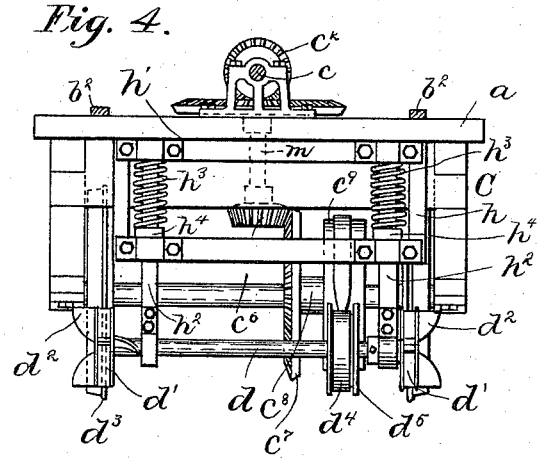
Figure 5:
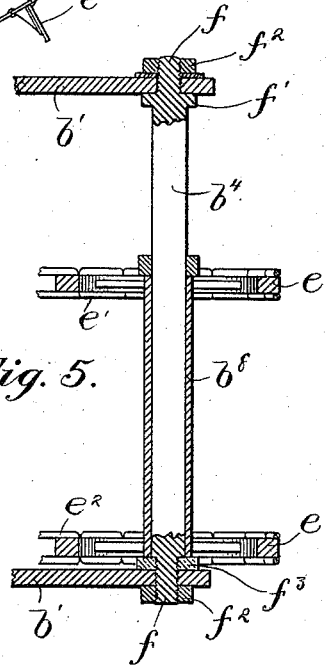
Figure 6:
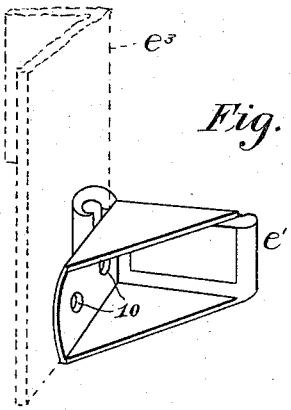

Figure 1 represents a top plan view of a snow-plow constructed in accordance with my invention. Fig. 2 is a side elevation thereof. Fig. 3 is a detail of the shovels and of the sprocket chains and wheels by which they are operated. Fig. 4 is a detail view of the rail-cleaning attachment. Fig. 5 represents a sectional view on the line 5 5 of Fig. 1. Fig. 6 is a detail showing the manner of attaching the shovels to the sprocket-chains.

My improved snow-plow A is composed of the plow proper, B, the track-cleaning attachment D, and some suitable truck-frame C, here shown as a separate structure, but which may be the structure of the car-body itself. Upon this truck C is mounted a shaft $c$, to which motion is imparted by a suitable motor $c'$ through the medium of gear-wheels 1 and 2.

I do not wish to be understood as limiting myself to any particular form of motive power, as I may have a separate motor which is driven by steam or in any desired way, or I may operate the truck and plow by an electric motor and take the current from a wire.

The plow B is composed of duplicate framework $b'$, secured together by posts $b^4$, $b^5$, and $b^6$, the framework $b'$ at the top of these posts being held by means of shoulders $f'$ on said posts and by means of nuts $f^2$, engaging reduced portions $f$ of said posts. At the lower end of said posts the framework $b'$ is held on by means of a nut $f^2$. This framework is secured to the truck C by arms $b^2$ and by a brace $b^3$ or in any other suitable way. Upon these posts are loosely mounted sleeves $b^8$, (see Fig. 5,) and upon the top and bottom of these sleeves are mounted sprocket-wheels $e$. Upon these wheels are mounted sprocket-chains $e'$, and at suitable intervals along these chains are mounted shovels $e^3$, which are attached to the links of the chains $e'$ by means of screws 10 (see Fig. 6) passing through said chain into said shovel, and by means of an arm 5 (see Fig. 3) projecting from said chain back of said shovel. Mounted in the framework $b'$ at the end next to the truck C is a vertical shaft $b^7$, provided with a sleeve $b^9$, fast upon said shaft. Upon this sleeve are mounted sprocket-wheels $e$, sprocket-chains $e'$ passing around these wheels and deriving their motion therefrom. This shaft $b^7$ is provided with a bevel-gear $c^4$, meshing with a similar gear $c^3$ upon the shaft $c$.

Referring to Figs. 1 and 2, it will be seen that these shovels $e^3$ stand in a vertical direction and that when motion is imparted to the sprocket-chain by means of the shaft $c$ the shovels will be carried around and will take the snow as the plow is forced ahead and carry it to one side of said plow. This is an important advantage, since it permits the snow to be cleared from the track without violent agitation and without throwing it between the tracks, as is done by snow-plows as at present devised, unless the snow is thrown back into a delivery-car, which is impracticable.

In most street-railways the rails are provided with a groove, and it is necessary to provide some attachment to clear these grooves of snow. Referring to Figs. 2 and 4, the track-cleaning attachment D consists of the shaft $d$, mounted in sockets in the ends of the arms $h^2$. These arms $h^2$ are mounted in frames $h$, fast upon the car-truck C. A helical spring $h^3$ is arranged upon these arms, between the upper ends $h'$ of said arms and the collar $h^4$, fast upon said arms. This permits the shaft $d$ to be set at a predetermined distance from the rails and to yield upwardly. Upon each end of this shaft $d$ are mounted disks $d'$, provided with fan-shaped blades $d^2$, arranged to clear the snow from the rails. These disks are provided upon their peripheries with spring-fingers $d^3$, arranged to play in the groove of the rail and clear the same of snow or other matter. These fingers are preferably spring-fingers in order to avoid breakage when they encounter obstructions.

Referring now to Fig. 4, $c^8$ is a sleeve upon the axle of the car-truck, provided with a bevel-gear $c^7$ and with a pulley $c^9$. A belt $d^4$ upon said pulley communicates motion from said pulley $c^9$ to a pulley $d^5$, fast upon the shaft $d$. The gear-wheel $c^7$ meshes with a gear-wheel $c^6$, fast upon a vertical shaft $m$, provided at its upper end with a bevel-gear $c^5$, meshing with a similar gear $c^2$ on the shaft $c$.

From the foregoing it will be seen that as the shaft $c$ rotates motion is imparted to the plow B and also to the track-cleaner D, the plow clearing the track of snow and packing it at one side of the street, while the cleaner, revolving as the car-truck is advanced, by means of its blades and fingers clears the rails and the grooves thereof of snow.

Instead of operating the plow and track-cleaning attachment by the mechanism as shown they may be run directly by a motor connected with the car or in any suitable way.

What I claim as my invention is as follows:

In a snow-plow, a framework provided with vertical shafts, sprocket-wheels fast upon said shafts, sprocket-chains mounted upon said wheels, shovels mounted upon said chains and arranged to rotate in a horizontal direction, combined with a rail-cleaner comprising a horizontal shaft, disks mounted upon each end of said horizontal shaft provided with fan-shaped blades to clear the snow from the tops of the rails, and with spring-fingers extending beyond the peripheries of said disks arranged to clear the grooves in the rails and means connected to said vertical shaft and to said horizontal shaft for imparting motion to said shovels and to said blades and fingers, substantially as and for the purpose set forth.

In testimony whereof I have signed my name to this specification, in the presence of two subscribing witnesses, this 10th day of December, A. D. 1894.

ABEL NUTTING.

Witnesses:
WILLIAM QUINBY,
E. BATCHELDER.